US010571359B2

(12) United States Patent
Su et al.

(10) Patent No.: US 10,571,359 B2
(45) Date of Patent: Feb. 25, 2020

(54) HYDRAULIC STRUCTURE SEEPAGE PROPERTY DISTRIBUTED OPTICAL FIBER SENSING INTEGRATED SYSTEM AND METHOD

(71) Applicant: HOHAI UNIVERSITY, Nanjing, Jiangsu (CN)

(72) Inventors: Huaizhi Su, Jiangsu (CN); Meng Yang, Jiangsu (CN); Chongshi Gu, Jiangsu (CN)

(73) Assignee: HOHAI UNIVERSITY, Nanjing, Jiangsu (CN)

( * ) Notice: Subject to any disclaimer, the term of this patent is extended or adjusted under 35 U.S.C. 154(b) by 261 days.

(21) Appl. No.: 15/736,027

(22) PCT Filed: Oct. 30, 2015

(86) PCT No.: PCT/CN2015/093368
§ 371 (c)(1),
(2) Date: Dec. 13, 2017

(87) PCT Pub. No.: WO2016/201857
PCT Pub. Date: Dec. 22, 2016

(65) Prior Publication Data
US 2018/0180510 A1    Jun. 28, 2018

(30) Foreign Application Priority Data

Jun. 19, 2015  (CN) .......................... 2015 1 0345172

(51) Int. Cl.
*G01M 3/38*   (2006.01)
*G01K 11/32*  (2006.01)

(52) U.S. Cl.
CPC ............... *G01M 3/38* (2013.01); *G01K 11/32* (2013.01)

(58) Field of Classification Search
CPC .................. G01M 11/085; E21B 47/06; A61B 2034/2055; G01K 11/32; G01K 11/3206;
(Continued)

(56) References Cited

U.S. PATENT DOCUMENTS 4,654,520 A     3/1987  Griffiths
4,988,155 A *   1/1991  Harner ...................... B08B 3/04
                                                    250/227.11
(Continued)

FOREIGN PATENT DOCUMENTS

CN    101490522          7/2009
CN    201266096 Y  *    7/2009
CN    102720949          10/2012

OTHER PUBLICATIONS

International Search Report filed in PCT/CN2015/093368 dated Mar. 22, 2016.

*Primary Examiner* — Gail Kaplan Verbitsky
(74) *Attorney, Agent, or Firm* — Rankin, Hill & Clark LLP

(57) ABSTRACT

A hydraulic structure seepage property distributed optical fiber sensing integrated system includes a special optical fiber for seepage measurement, an optical fiber calibration device, an optical fiber laying device, and a seepage property identification device. After the optical fiber calibration device calibrates the special optical fiber for seepage measurement on site, the special optical fiber for seepage measurement is laid and tested with the aid of the optical fiber laying device, and is connected to the seepage property identification device for information collection, processing and analysis after the test is successful.

9 Claims, 6 Drawing Sheets

(58) Field of Classification Search
CPC .. G01K 1/14; G01N 21/00; G01N 2021/6484; G01N 2201/08; G01N 2291/02836; G01H 9/004
USPC ........... 374/4, 1, 2, 130, 131, 137, 45, 57, 5
See application file for complete search history.

(56) References Cited

U.S. PATENT DOCUMENTS

| | | | |
|---|---|---|---|
| 6,526,807 | B1 | 3/2003 | Doumit |
| 6,881,948 | B2* | 4/2005 | Dammann ............. B64D 45/00 250/227.14 |
| 7,672,544 | B2* | 3/2010 | Takabayashi ........ B60K 15/077 385/12 |
| 8,789,587 | B2* | 7/2014 | Tubel ...................... E21B 23/03 166/250.15 |
| 10,095,000 | B2* | 10/2018 | Su .......................... G01D 5/268 |
| 10,416,085 | B2* | 9/2019 | Su .......................... G01K 11/32 |
| 2004/0109228 | A1* | 6/2004 | Aronstann ............ E21B 47/123 359/341.3 |
| 2004/0141420 | A1* | 7/2004 | Hardage ................. E21B 47/00 367/149 |
| 2009/0034901 | A1* | 2/2009 | Takabayashi ........ B60K 15/077 385/12 |

\* cited by examiner

HYDRAULIC STRUCTURE SEEPAGE PROPERTY DISTRIBUTED OPTICAL FIBER SENSING INTEGRATED SYSTEM AND METHOD

TECHNICAL FIELD

The present invention relates to a hydraulic structure seepage property distributed optical fiber sensing integrated system and a method, and belongs to the field of water conservancy and hydroelectricity engineering safety monitoring.

BACKGROUND

For a hydraulic structure, seepage is one of the key factors affecting its safety service. To strengthen the effective sensing of seepage property is of great significance to find out the safety hazards in time and ensure the reliable operation of the hydraulic structure. With the development of a distributed optical fiber sensing technology, it has become an important research direction in the field of engineering safety like water conservancy and civil engineering to obtain the property information of the structure and sense the health conditions of the structure. However, there are still many technical problems that need to be solved and improved due to the particularity of the working environment and structural characteristics in the actual application of hydraulic structure seepage property distributed optical fiber sensing engineering.

First of all, when a sensing optical fiber is used for seepage monitoring, external circuits are usually needed to heat the optical fiber at current, and there are defects on such aspects like poor resistance to pressure and coordination deformation, and low seepage sensitivity. Therefore, it is desirable to sufficiently consider the characteristics of hydraulic seepage monitoring and special working environments, focus on the production and assembly of the sensing optical fiber itself, and develop a special optical fiber for seepage monitoring having an automatic control heat source, so as to improve the performance index and practical ability of the optical fiber seepage measurement technology. In addition, the most commonly used distributed optical fiber temperature sensing technology for indirectly sensing structure seepage property uses anti-Stokes Raman scattered light as a temperature measuring signal, uses a laser single pulse as a pump signal, and uses Stokes Raman scattered light as a temperature measurement reference channel But it has the defects of uneasily adjusted pulse width, low spatial resolution, and poor signal to noise ratio.

Secondly, in the application of monitoring a sensing optical fiber longer than 100 meters, only one or a few segments of the optical fiber are calibrated at present on the basis of segmentation calibration, with the average value of the temperature coefficient of the segment selected as the temperature coefficient of the entire sensing optical fiber. The precision will be constantly reduced with the increase of the length of the sensing optical fiber, and the method has the disadvantages of low calibration efficiency, short calibration length, low load weight, difficulty in cooling and cooling, and uneasy control of temperature. The long-distance wide-range effective calibration problem becomes one of the important obstacles to apply and promote the distributed sensing technology in hydraulic structure seepage property sensing in large scale.

Thirdly, in actual engineering application, the monitoring precision of the laid optical fiber is often reduced or the measured value is seriously distorted, and can't even be obtained since improper bending occurs or a bending section does not be effectively protected. Improper laying of the optical fiber causes the optical fiber to be not in conformity with the size and construction requirements of engineering structure and results in wastes. The laying of the sensing optical fiber, and especially the reasonable adjustment and control of the bending curvature radius of the optical fiber has become an important technical problem that affects the monitoring precision, service life and construction progress, etc. It is desirable to develop a device and a method for optical fiber bending curvature controlling and measuring with strong adaptability and operation accessibility, so as to reduce dependency on laying personnel, improve the survival rate for laying the optical fiber, prolong the service life of the sensing optical fiber, and sense dam property more effectively and accurately.

SUMMARY

Object of the invention: in order to overcome the defects in the prior art, the present invention provides a hydraulic structure seepage property distributed optical fiber sensing integrated system and a sensing method, which can accomplish effective calibration of a long optical fiber as well as reliable control and measurement of the bending curvature, and can sense the hydraulic structure seepage property with high precision, high spatial resolution, high sensing speed and long distance.

Technical solution: in order to achieve the above object, a hydraulic structure seepage property distributed optical fiber sensing integrated system of the present invention comprises a seepage property identification device, a special optical fiber for seepage measurement, an optical fiber calibration device and an optical fiber laying device. The special optical fiber for seepage measurement after being calibrated to be qualified by the optical fiber calibration device is mounted in a region to be monitored through the optical fiber laying device, and is connected to the seepage property identification device.

The optical fiber laying device comprises a bending table and a guide path located on the bending table, the middle of the guide path is provided with a guide groove, the special optical fiber for seepage measurement to be laid is mounted in the guide groove, the guide path comprises a first straight-line section, a second straight-line section and a bending section connecting the first straight-line section with the second straight-line section, the first straight-line section is fixed on the bending table through a plurality of groups of first locking devices, the inside of the middle of the bending section is connected to a diameter-variable table, one end of the diameter-variable table is connected to a diameter-variable connecting pole, the diameter-variable connecting pole passes through a round guide table, the two sides of the round guide table are provided with round connecting poles in thread connection with the round guide table, the round connecting pole is connected to a round connecting pole handle, the other end of the diameter-variable table is connected to a fastening plug the top end of which is provided with a circular arc, the fastening plug is provided with a guide hole for the guide path to pass through, the inside of the guide hole is provided with a push pedal, the push pedal is connected to a push rod, and the push rod is in thread connection with the fastening plug; the second straight-line section is provided with a second locking device, the bottom of the second locking device is extended with a boss, the section of the boss is a parallelogram with a 45-degree included angle, the bending table is provided with a guide-track groove forming a 45-degree included angle with the first straight-line section and the second straight-line section, the boss moves along the guide-track groove, the bending table is provided with a vertical scale parallel to the second straight-line section, the zero point of the vertical scale is the intersection point of the special optical fiber for seepage measurement to be laid and the first locking device in the rightmost side, the origin of the guide-track groove is located at the zero point of the vertical scale, the intersection of the bending section and the first straight-line section is provided with a first radius rule tangential to the bending section, and the intersection of the bending section and the second straight-line section is provided with a second radius rule tangential to the bending section.

Preferably, the tail end of the first radius rule is internally sleeved with a first radius contraction rule, and the tail end of the second radius rule is internally sleeved with a second radius contraction rule.

Preferably, the first locking device comprises a first connecting table, and a first locking rod and a first handle in thread connection with the first connecting table, the first connecting table is a rectangular block, a first recess for the guide path to pass through is arranged below the first connecting table, the first recess is internally provided with a first pressing plate located above the guide path, the first pressing plate is connected below the first locking rod, and the first handle is mounted above the first locking rod; the second locking device comprises a second connecting table, and a second locking rod and a second handle in thread connection with the second connecting table, a second recess for the guide path to pass through is arranged below the second connecting table, the second recess is internally provided with a second pressing plate located above the guide path, the second pressing plate is connected below the second locking rod, the second handle is mounted above the second locking rod, a boss is extended below the second connecting table, and the two sides of the second connecting table are extended with a lug.

Preferably, the hydraulic structure seepage property distributed optical fiber sensing integrated system comprises a heat insulation barrel and a plurality of calibration modules located in the heat insulation barrel, the plurality of calibration modules are arranged around the circumference of the axis of the heat insulation barrel, the calibration module comprises a through-shaft, a first electronic thermometer and a second electronic thermometer, the special optical fiber for seepage measurement to be calibrated is twisted on the through-shaft, the special optical fiber for seepage measurement is connected to an optical fiber temperature demodulator outside the heat insulation barrel, the first electronic thermometer and the second electronic thermometer are respectively connected to a first temperature control meter and a second temperature control meter outside the heat insulation barrel, a temperature source wire for heating water in the heat insulation barrel is arranged in the wall of the heat insulation barrel, the temperature source wire is connected to a power temperature control meter outside the heat insulation barrel, the first temperature control meter is connected to a first power-off spring and a second power-off spring simultaneously through first temperature control meter leads, the first power-off spring is connected to a first conductive magnet, the first conductive magnet is in series connection with an electromagnetic circuit switch and a second conductive magnet simultaneously, the first conductive magnet is arranged opposite to a first conductive iron-sensitive block, the first conductive iron-sensitive block is connected to a pump through a cable wire of the pump, the pump is located in a circulating water tank, and the pump conveys water in the circulating water tank into the heat insulation barrel through a pressure inlet pipe; the second temperature control meter is connected to a third power-off spring through a lead of the second temperature control meter, the third power-off spring is connected to a third conductive magnet, the third conductive magnet is arranged opposite to a third conductive iron-sensitive block, the third conductive magnet is connected to a power supply through a sintesistor, and the power supply is connected to the electromagnetic circuit switch; the power temperature control meter is connected to the third conductive iron-sensitive block and a second conductive iron-sensitive block simultaneously through power temperature control leads, the second conductive iron-sensitive block is in series connection with the third conductive iron-sensitive block, the second conductive magnet is in series connection with the third conductive magnet, and the second conductive magnet is in series connection with the second power-off spring.

Preferably, the heat insulation barrel comprises a barrel body and a barrel cover, the barrel body comprises an outer hard protection barrel, a middle heat insulation layer, a hot-wire placement layer and an inner hard protection layer from outside to inside, the barrel cover is a heat insulation hard protection plate, the top of the barrel body is provided with a protection plate groove, and a protection plate cross-rail capable of moving along the protection plate groove is mounted below the heat insulation hard protection plate; the lower end of the through-shaft is mounted in the inner hard protection layer through a thread, the top end of the through-shaft is connected to a top plate through a top plate thread, and the upper end face of the top plate is connected to a cover mat.

Preferably, the cover mat is arranged along the circumferences of the top plate and the through-shaft, the temperature source wire is arranged along the entire circumference of the hot-wire placement layer from bottom to high, and both the side of the middle heat insulation layer and the side of the inner hard protection layer close to the temperature source wire are provided with a metal protection layer for protection.

Preferably, the hydraulic structure seepage property distributed optical fiber sensing integrated system comprises an optical path coupler and a synchronous controller, the special optical fiber for seepage measurement is laid in a hydraulic structure seepage property monitoring region in a vertically staggered manner, the special optical fiber for seepage measurement is connected to the optical path coupler, a monitoring thermostatic chamber is arranged between the special optical fiber for seepage measurement and the optical path coupler, the synchronous controller is connected to a mode locked laser, a first wavelength division multiplexer, a polarization beam splitter, an isolator, a nonlinear amplifier, a grating pair, a liquid-crystal spatial light modulator, a diffraction grating, a reflector, a beam splitter, a nonlinear crystal, a spectrograph and a Michelson interferometer in sequence, the output end the Michelson interferometer is connected to the optical path coupler, the output end of the optical path coupler is respectively connected to a detector and a second optical splitter, the detector is connected to a digital signal processor, the second optical splitter is connected to the digital signal processor through an amplifying circuit, the output end of the digital signal processor is respectively connected to the synchronous controller and a collector, the output end of the collector is respectively connected to the synchronous controller and a computer, the computer is connected to a module configured with a remote cloud database, and the module configured with a remote cloud database collects and conveys information to a monitoring information management and analysis assessment module.

Preferably, the amplifying circuit comprises a first amplifying circuit, a second amplifying circuit and a third amplifying circuit in parallel connection, the first amplifying circuit comprises a first photodiode, a third amplifier and a Stokes receiver connected in sequence, the second amplifying circuit comprises a second photodiode, a fourth amplifier and an anti-Stokes receiver connected in sequence, the third amplifying circuit comprises a third photodiode, a fifth amplifier and a Reyleigh optical receiver connected in sequence, the first photodiode, the second photodiode and the third photodiode are respectively connected to the output end of the second optical splitter.

Preferably, the output end of the Michelson interferometer is connected to an optoelectronic switch, the optoelectronic switch is provided with an L-side switch and an R-side switch, the L-side switch is connected to the input end of a master femtosecond impulse, the R-side switch is connected to an auxiliary femtosecond impulse, the master femtosecond impulse light of the master femtosecond impulse can enter the optical signal input end of the first amplifier, the auxiliary femtosecond impulse light of the auxiliary femtosecond impulse can enter the optical signal input end of the second amplifier, the optical signal output port of the first amplifier is connected to the input port of a first optical splitter, the output port of the first optical splitter is respectively connected to the signal input port of a second optical filter and the signal input port of a third optical filter, the optical signal output port of the second amplifier is connected to the optical signal input end of a first optical filter, the output ends of the first optical filter, the second optical filter and the third optical filter are connected to the input end of a second wavelength division multiplexer, and the output end of the second wavelength division multiplexer is connected to the input end of the second optical splitter.

A sensing method of the hydraulic structure seepage property distributed optical fiber sensing integrated system according as mentioned above comprises the following steps of:

step 1: laying a special optical fiber for seepage measurement into an optical fiber calibration device in a spiral form, and calibrating a temperature coefficient of the special optical fiber for seepage measurement to be laid through the optical fiber calibration device;

step 2: determining the number of the optical fiber laying device according to design requirements, and then fixing the calibrated special optical fiber for seepage measurement to a region for measuring the hydraulic structure; and step 3: driving the special optical fiber for seepage measurement laid to perform information acquisition through a seepage property identification device, and analyzing and identifying a hydraulic structure seepage property.

In the present invention, after the electromagnetic circuit switch is turned on, the third conductive magnet, the second conductive magnet and the first conductive magnet generate magnetism due to instantaneous energization, and then the third conductive iron-sensitive block, the second conductive iron-sensitive block and the first conductive iron-sensitive block are sucked to the corresponding conductive magnets, and the power temperature control meter will be connected into an access so as to heat the temperature source wire; when a temperature value on the first temperature control meter or on the second temperature control meter is reached, the sintesistor in the connected circuit will be disconnected; at this moment, the third conductive magnet, the second conductive magnet and the first conductive magnet lose magnetism, then the third conductive magnet, the second conductive magnet and the first conductive magnet without magnetism are respectively bounced off from the third conductive iron-sensitive block, the second conductive iron-sensitive block and the first conductive iron-sensitive block by means of the third power-off spring, the second power-off spring and the first power-off spring which are compressed; then a disconnected state is kept and heating is stopped to achieve warming up. When the circuit where the electromagnetic circuit switch locates is connected, the power temperature control meter is disconnected, the pump is enabled, and cold water is injected into the calibration device through the pressure inlet pipe on the basis of the given temperature which needs to be reduced; when reaching the predetermined temperature drop value, the sintesistor is disconnected, the third conductive magnet, the second conductive magnet and the first conductive magnet lose magnetism, and then the third conductive magnet, the second conductive magnet and the first conductive magnet without magnetism are respectively bounced off from the third conductive iron-sensitive block, the second conductive iron-sensitive block and the first conductive iron-sensitive block by the third power-off spring, the second power-off spring and the first power-off spring; then the disconnected state is kept and heating is stopped to achieve warming up.

Beneficial effects: the hydraulic structure seepage property distributed optical fiber sensing integrated system of the present invention, by means of integrating the special optical fiber for seepage measurement, the optical fiber calibration device, the optical fiber laying device and the seepage property identification device, can implement temperature regulation of the automatic control heat source during far-distance heavy-weight optical fiber calibrating and monitoring, can effectively and exactly achieve bending curvature setting of the optical fiber and laying of the optical fiber, can warm up and cool automatically, has the characteristics of high precision, high spatial resolution and high operating speed, greatly improves the calibrating precision and laying efficiency, remarkably improves the seepage identification level, and has prominent advantages in the aspects of monitoring cost reduction and engineering practicability.

DETAILED DESCRIPTION

The present invention is further explained with reference to the drawings hereinafter.

Figure 1:
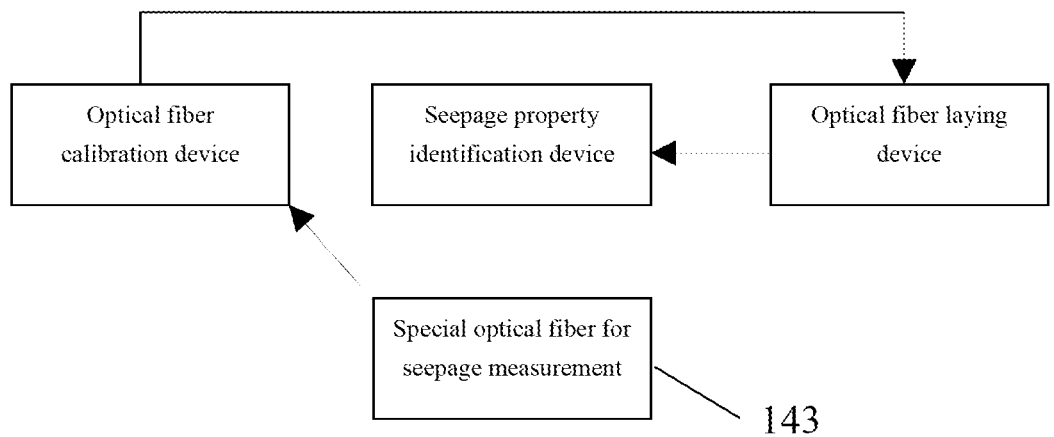
FIG. 1 is a principle schematic diagram of the present invention.
Figure 2:
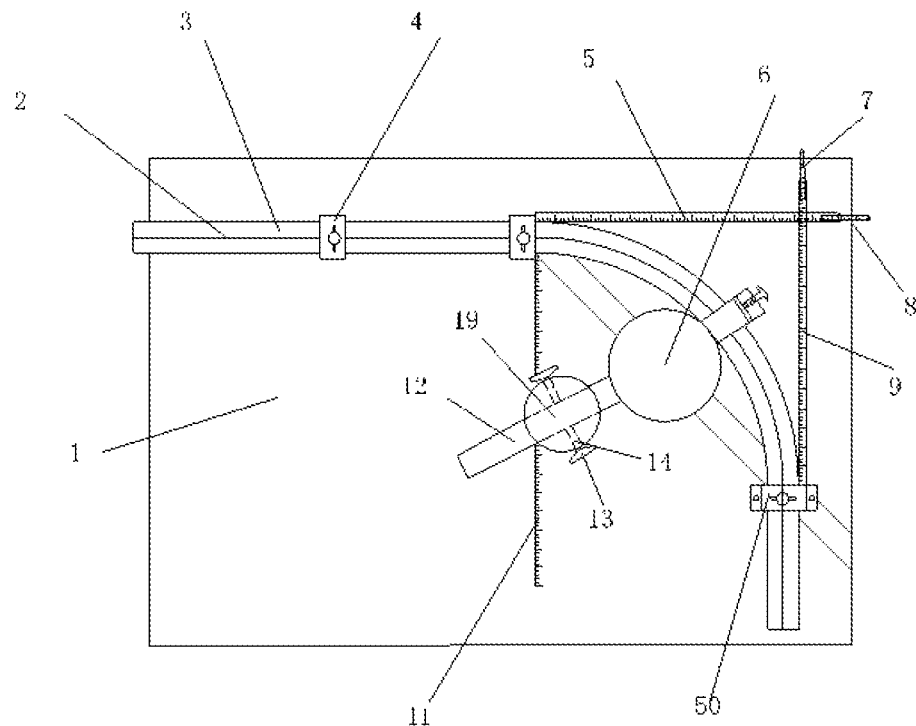
FIG. 2 is a structural schematic diagram of an optical fiber laying device in FIG. 1.
Figure 3:
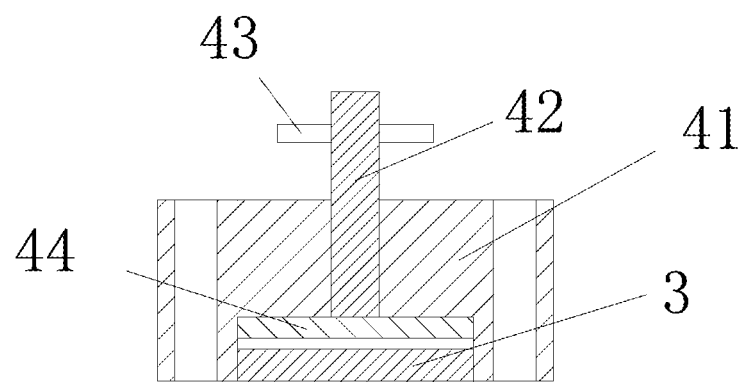
FIG. 3 is a structural schematic diagram of a first locking device in FIG. 2.
Figure 4:
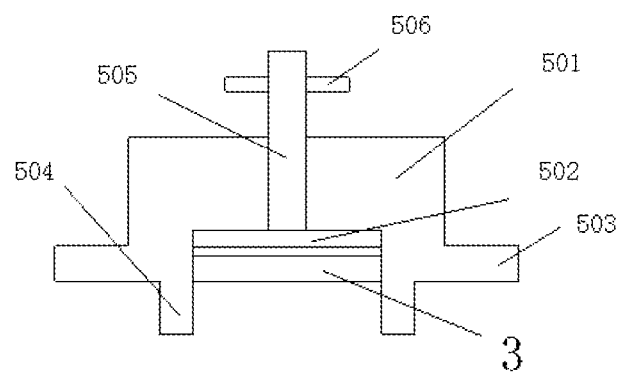
FIG. 4 is a front structural schematic diagram of a second locking device in FIG. 2.
Figure 5:
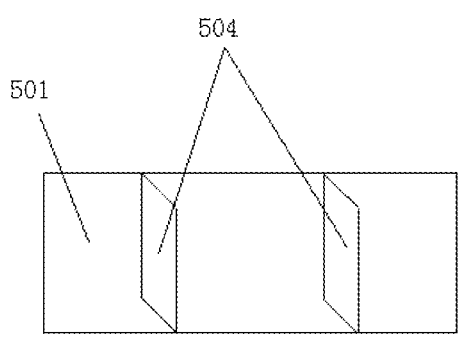
FIG. 5 is a back structural schematic diagram of the second locking device in FIG. 4.
Figure 6:
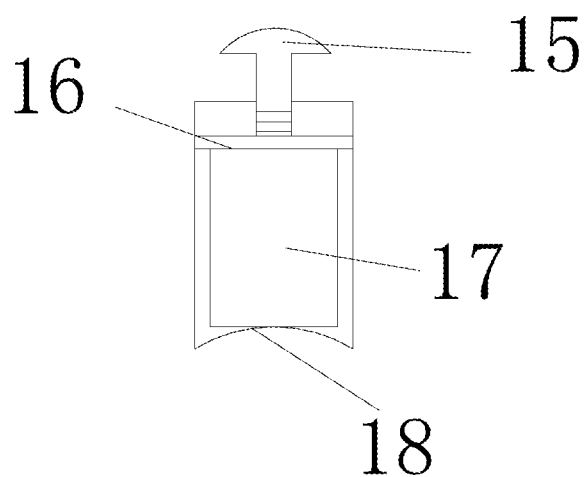
FIG. 6 is a structural schematic diagram of a fastening plug in FIG. 1.
Figure 7:
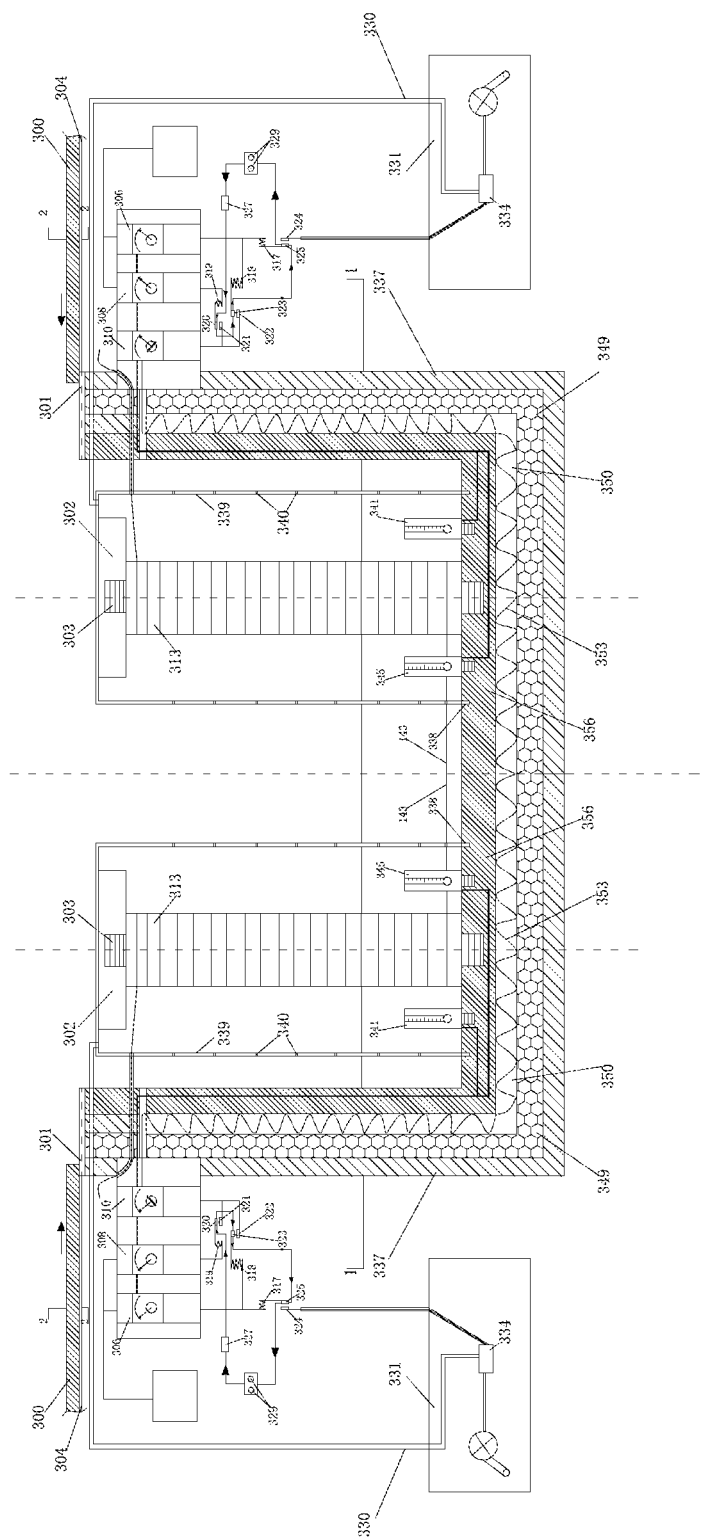
FIG. 7 is a structural schematic diagram of an optical fiber calibration device in FIG. 1.
Figure 8:
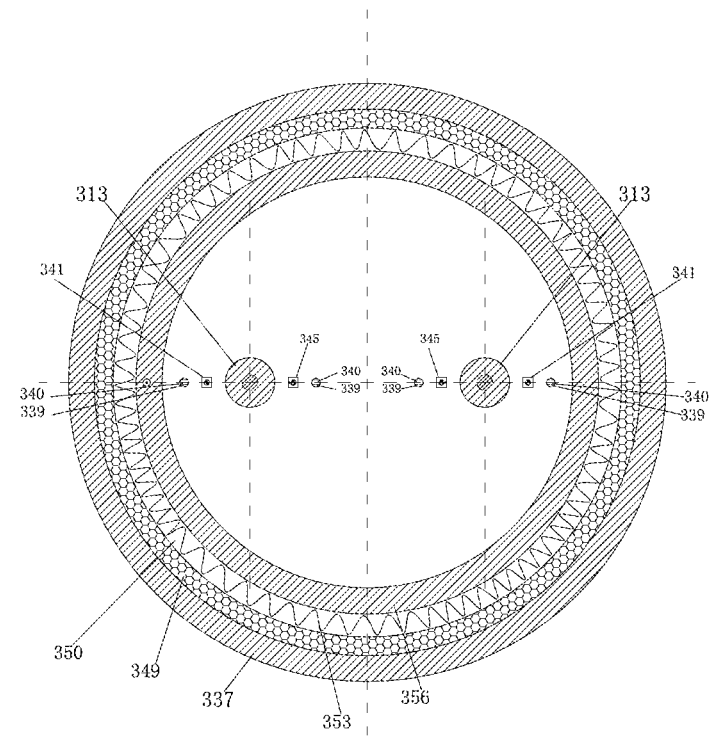
FIG. 8 is a 1-1 sectional view in FIG. 7.
Figure 9:
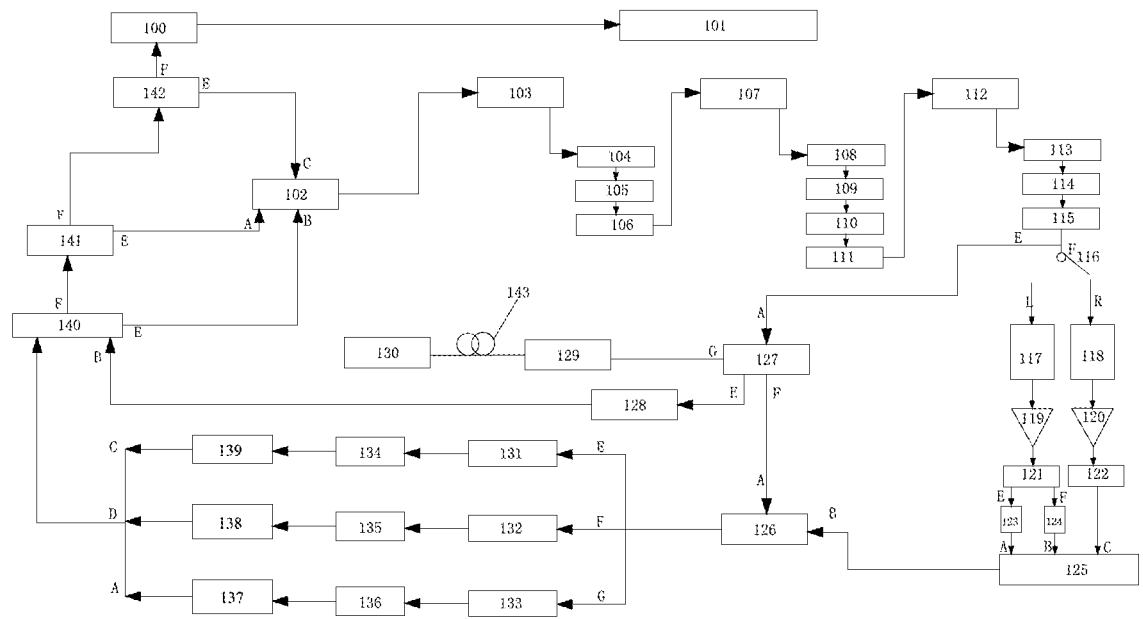
FIG. 9 is a schematic diagram of a seepage property identification device in FIG. 1.
Figure 10:
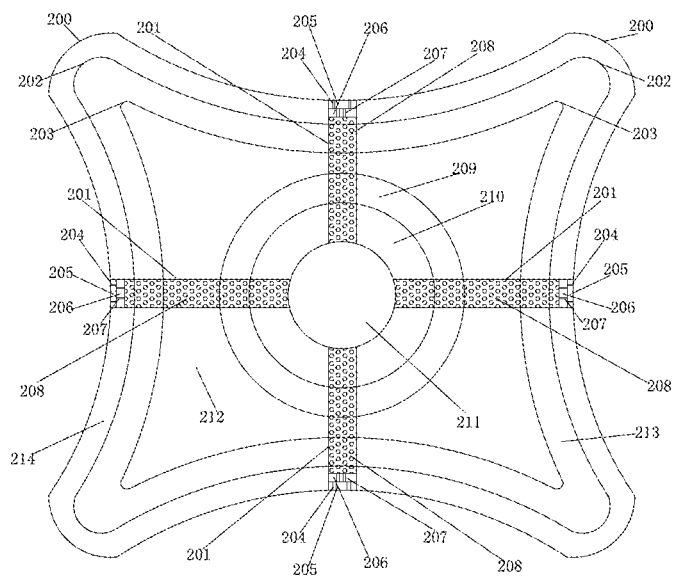
FIG. 10 is a structural schematic diagram of a single-mode optical fiber having an automatic control heat source specifically produced for seepage in FIG. 9.
Figure 11:
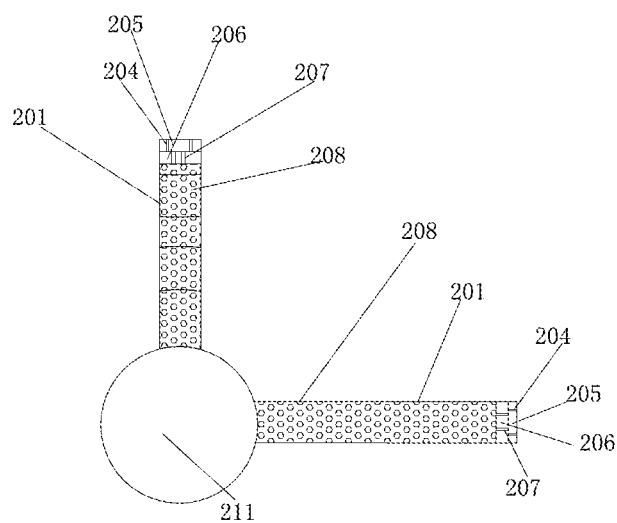
FIG. 11 is a detailed structural drawing of an outer circular sheathing protection pipe in FIG. 10.

As shown in FIG. 1 to FIG. 11, a hydraulic structure seepage property distributed optical fiber sensing integrated system of the present invention comprises a special optical fiber for seepage measurement 143, an optical fiber calibration device, an optical fiber laying device, and a seepage property identification device. After the optical fiber calibration device calibrates the special optical fiber for seepage measurement 143 on site, the special optical fiber for seepage measurement 143 is laid and tested with the aid of the optical fiber laying device, and is connected to the seepage property identification device for information collection, processing and analysis after the test is successful.

The optical fiber laying device comprises a bending table 1 and a guide path 3 located on the bending table 1, the guide path 3 is made of flexible plastic, the middle of the guide path 3 is provided with a guide groove, an optical fiber to be measured 2 is mounted in the guide groove, the optical fiber to be measured 2 is the special optical fiber for seepage measurement 143, the guide path 3 comprises a first straight-line section, a second straight-line section and a bending section connecting the first straight-line section with the second straight-line section, the first straight-line section is fixed on the bending table 1 through a plurality of groups of first locking devices 4, the inside of the middle of the bending section is connected to a diameter-variable table 6, one end of the diameter-variable table 6 is connected to a diameter-variable connecting pole 12, the diameter-variable connecting pole 12 passes through a round guide table 19, the two sides of the round guide table 19 are provided with round connecting poles 14 in thread connection with the round guide table 19, the round connecting pole 14 is connected to a round connecting pole handle 13, the other end of the diameter-variable table 6 is connected to a fastening plug the top end of which is provided with a circular arc, the fastening plug is provided with a guide hole 17 for the guide path 3 to pass through, the inside of the guide hole 17 is provided with a push pedal 16, the push pedal 16 is connected to a push rod 15, and the push rod 15 is in thread connection with the fastening plug; the second straight-line section is provided with a second locking device 50, the bottom of the second locking device 50 is extended with a boss 504, the section of the boss 504 is a parallelogram with a 45-degree included angle, the bending table 1 is provided with a guide-track groove forming a 45-degree included angle with the first straight-line section and the second straight-line section, the boss moves along the guide-track groove, the bending table 1 is provided with a vertical scale parallel to the second straight-line section, the zero point of the vertical scale is the intersection point of the special optical fiber for seepage measurement to be laid and the first locking device 4 in the rightmost side, the origin of the guide-track groove is located at the zero point of the vertical scale, the intersection of the bending section and the first straight-line section is provided with a first radius rule 5 tangential to the bending section, and the intersection of the bending section and the second straight-line section is provided with a second radius rule 9 tangential to the bending section.

In the present invention, the tail end of the first radius rule 5 is internally sleeved with a first radius contraction rule 8, and the tail end of the second radius rule 9 is internally sleeved with a second radius contraction rule 7. The first locking device 4 comprises a first connecting table 41, and a first locking rod 42 and a first handle 43 in thread connection with the first connecting table 41, the first connecting table 41 is a rectangular block, a first recess for the guide path 3 to pass through is arranged below the first connecting table 41, the first recess is internally provided with a first pressing plate 44 located above the guide path 3, the first pressing plate 42 is connected below the first locking rod 44, and the first handle 43 is mounted above the first locking rod 42; the second locking device 50 comprises a second connecting table 501, and a second locking rod 505 and a second handle 506 in thread connection with the second connecting table 501, a second recess for the guide path 3 to pass through is arranged below the second connecting table 501, the second recess is internally provided with a second pressing plate 502 located above the guide path 3, the second pressing plate 502 is connected below the second locking rod 505, the second handle 506 is mounted above the second locking rod 505, and the two sides of the second connecting table 504 are extended with a lug 503. A boss 104 is extended below the second connecting table 501, the section of the boss 504 is a parallelogram with a 45-degree included angle, and the second connecting table 501 and the boss 104 form a 45-degree included angle, thus ensuring that the first straight-line section and the second straight-line section form a 90-degree included angle, and eliminating angular errors. The bending table 1 is provided with a guide-track groove forming a 45-degree included angle with the first straight-line section and the second straight-line section, the boss 504 moves along the guide-track groove, the bending table 1 is provided with a vertical scale 11 parallel to the second straight-line section, the zero point of the vertical scale 11 is the intersection point of the optical fiber to be measured 2 and the first locking device 4 in the rightmost side, the origin of the guide-track groove is located at the zero point of the vertical scale 11, the intersection of the bending section and the first straight-line section is provided with a first radius rule 5 tangential to the bending section, and the intersection of the bending section and the second straight-line section is provided with a second radius rule 9 tangential to the bending section. The tail end of the first radius rule 5 is internally sleeved with a first radius contraction rule 8, and the tail end of the second radius rule 9 is internally sleeved with a second radius contraction rule 7.

In the present invention, the optical fiber calibration device comprises a heat insulation barrel and a plurality of calibration modules located in the heat insulation barrel, the plurality of calibration modules are arranged around the circumference of the axis of the heat insulation barrel, the calibration module comprises a through-shaft 313, a first electronic thermometer 341 and a second electronic thermometer 345, the special optical fiber for seepage measurement to be calibrated 143 is twisted on the through-shaft 313, the special optical fiber for seepage measurement 143 is connected to an optical fiber temperature demodulator outside the heat insulation barrel, the first electronic thermometer 341 and the second electronic thermometer 345 are respectively connected to a first temperature control meter 306 and a second temperature control meter 308 outside the heat insulation barrel, a temperature source wire 353 for heating water in the heat insulation barrel is arranged in the wall of the heat insulation barrel, the temperature source wire 353 is connected to a power temperature control meter 310 outside the heat insulation barrel, the first temperature control meter 306 is connected to a first power-off spring 317 and a second power-off spring 318 simultaneously through leads of the first temperature control meter 306, the first power-off spring 317 is connected to a first conductive magnet 325, the first conductive magnet 325 is in series connection with an electromagnetic circuit switch 329 and a second conductive magnet 323 simultaneously, the first conductive magnet 325 is arranged opposite to a first conductive iron-sensitive block 324, the first conductive iron-sensitive block 324 is connected to a pump 334 through a cable wire 323 of the pump 334, the pump 334 is located in a circulating water tank 331, and the pump 334 conveys water in the circulating water tank 331 into the heat insulation barrel through a pressure inlet pipe 330; the second temperature control meter 308 is connected to a third power-off spring 319 through a lead of the second temperature control meter 308, the third power-off spring 319 is connected to a third conductive magnet 320, the third conductive magnet 320 is arranged opposite to a third conductive iron-sensitive block 321, the third conductive magnet 320 is connected to a power supply through the sintesistor 327, and the power supply is connected to the electromagnetic circuit switch 329; the power temperature control meter 310 is connected to the third conductive iron-sensitive block 321 and a second conductive iron-sensitive block 322 simultaneously through power temperature control leads, the second conductive iron-sensitive block 322 is in series connection with the third conductive iron-sensitive block 321, the second conductive magnet 323 is in series connection with the third conductive magnet 320, and the second conductive magnet 323 is in series connection with the second power-off spring 318.

In the present invention, the heat insulation barrel comprises a barrel body and a barrel cover, the barrel body comprises an outer hard protection barrel 337, a middle heat insulation layer 349, a hot-wire placement layer 350 and an inner hard protection layer 356 from outside to inside, the barrel cover is a heat insulation hard protection plate 300, the top of the barrel body is provided with a protection plate groove 301, and a protection plate crossrail 304 capable of moving along the protection plate groove 301 is mounted below the heat insulation hard protection plate 300; the lower end of the through-shaft 313 is mounted in the inner hard protection layer 356 through a thread, the top end of the through-shaft 313 is connected to a top plate 302 through a thread, the upper end face of the top plate 302 is connected to a cover mat 339. The cover mat 339 is arranged along the circumferences of the top plate 302 and the through-shaft 313, the temperature source wire 353 is arranged along the entire circumference of the hot-wire placement layer 350 from bottom to high, and both the side of the middle heat insulation layer 349 and the side of the inner hard protection layer 356 close to the temperature source wire 353 are provided with a metal protection layer for protection. The first electronic thermometer 341 and the second electronic thermometer 345 are respectively connected to the first temperature control meter 306 and the second temperature control meter 308 through an electrical lead, and the electrical lead is located in the inner hard protection layer 356. The special optical fiber for seepage measurement 143, the temperature source wire 353 and the pressure inlet pipe 330 respectively pass through the wall of the heat insulation barrel.

In the present invention, the seepage property identification device comprises an optical path coupler 127 and a synchronous controller 102, the special optical fiber for seepage measurement 143 is laid in a hydraulic structure seepage property monitoring region 130 in a vertically staggered manner, the special optical fiber for seepage measurement 143 is connected to the optical path coupler 127, a monitoring thermostatic chamber 129 is arranged between the special optical fiber for seepage measurement 143 and the optical path coupler 127, the synchronous controller 102 is connected to a mode locked laser 103, a first wavelength division multiplexer 104, a polarization beam splitter 105, an isolator 106, a nonlinear amplifier 107, a grating pair 108, a liquid-crystal spatial light modulator 109, a diffraction grating, a reflector 111, a beam splitter 112, a nonlinear crystal 113, a spectrograph 114 and a Michelson interferometer 115 in sequence, the output end of the Michelson interferometer 115 is connected to the optical path coupler 127, the output end of the optical path coupler 127 is respectively connected to a detector 128 and a second optical splitter 126, the detector 128 is connected to a digital signal processor 140, the second optical splitter 126 is connected to the digital signal processor 140 through an amplifying circuit, the output end of the digital signal processor 140 is respectively connected to the synchronous controller 102 and a collector 141, the output end of the collector 141 is respectively connected to the synchronous controller 102 and a computer 142, the computer 142 is connected to a module configured with a remote cloud database 100, and the module configured with a remote cloud database 100 collects and conveys information to a monitoring information management and analysis assessment module 101.

In the present invention, the amplifying circuit comprises a first amplifying circuit, a second amplifying circuit and a third amplifying circuit in parallel connection, the first amplifying circuit comprises a first photodiode 131, a third amplifier 134 and a Stokes receiver 139 connected in sequence, the second amplifying circuit comprises a second photodiode 132, a fourth amplifier 135 and an anti-Stokes receiver 138 connected in sequence, the third amplifying circuit comprises a third photodiode 133, a fifth amplifier 136 and a Reyleigh optical receiver 137 connected in sequence, the first photodiode 131, the second photodiode 132 and the third photodiode 133 are respectively connected to the output end of the second optical splitter 126.

In the present invention, the output end of the Michelson interferometer 115 is connected to an optoelectronic switch 116, the optoelectronic switch 116 is provided with an L-side switch and an R-side switch, the L-side switch is connected to the input end of a master femtosecond impulse 117, the R-side switch is connected to an auxiliary femtosecond impulse 118, the master femtosecond impulse light of the master femtosecond impulse 117 can enter the optical signal input end of the first amplifier 119, the auxiliary femtosecond impulse light of the auxiliary femtosecond impulse 118 can enter the optical signal input end of the second amplifier 120, the optical signal output port of the first amplifier 119 is connected to the input port of a first optical splitter 121, the output port of the first optical splitter 121 is respectively connected to the signal input port of a second optical filter 123 and the signal input port of a third optical filter 124, the optical signal output port of the second amplifier 120 is connected to the optical signal input end of a first optical filter 122, the output ends of the first optical filter 122, the second optical filter 123 and the third optical filter 124 are connected to the input end of a second wavelength division multiplexer 125, and the output end of the second wavelength division multiplexer 125 is connected to the input end of the second optical splitter 126.

In the present invention, the special optical fiber for seepage measurement 143 is provided with a single-core optical fiber 211, an inner protective elastic layer 210, a heat insulation steel ring 209, an inner-layer filling protection ring 212, an elastic hard ring 213, and an anti-seepage heat insulation hard sleeve ring 214 arranged in sequence from inside to outside. The single-core optical fiber 211 is respectively connected to a plurality of outer circular sheathing protection pipes 201, the outer circular sheathing protection pipes 201 sequentially pass through the inner protective elastic layer 210, the heat insulation steel ring 209, the inner-layer filling protection ring 212 and the elastic hard ring 213 in sequence and are connected to the anti-seepage heat insulation hard sleeve ring 214, each outer circular sheathing protection pipe 201 is filled with a drainage water storage cotton sleeve 208, the drainage water storage cotton sleeve 208 is connected to a second filter screen 206, the second filter screen 206 is provided with a gauze through-hole 207 of the second filter screen, the second filter screen 206 is connected to a first filter screen 205 externally, and the first filter screen 205 is provided with a gauze through-hole 204 of the first filter screen. The elastic hard ring 213 and the anti-seepage heat insulation hard sleeve ring 214 are irregular quadrilateral frames, the four sides of the quadrilateral frame are depressed inwards, and the four corners of the quadrilateral frame are round corners.

In the present invention, the aperture of the gauze through-hole 204 of the first filter screen arranged on the first filter screen 205 207 is greater than the aperture of the gauze through-hole 207 of the second filter screen arranged on the second filter screen 206, and the difference of the aperture of the two gauze through-holes is more than two times. Four outer circular sheathing protection pipes 201 are arranged, and respectively located on 0-degree, 90-degree. 180-degree and 270-degree radix directions of the single-core optical fiber 211. Both the first filter screen 205 and the second filter screen 206 are located inside the anti-seepage heat insulation hard sleeve ring 214.

In the present invention, a method of sensing seepage property of a region to be measured using the hydraulic structure seepage property distributed optical fiber sensing integrated system comprises the following steps.

In step 1, the single-core optical fiber 211 is pressed in the heat insulation steel ring 209, the inner protective elastic layer 210, the inner-layer filling protection ring 212, the elastic hard ring 213 and the anti-seepage heat insulation hard sleeve ring 214, and the outer circular sheathing protection pipes 201, the first filter screen 205, the second filter screen 206, the gauze through-hole 207 of the second filter screen and the gauze through-hole 204 of the first filter screen are used to assemble the special optical fiber for seepage measurement 143 having functions of drainage, flow control, heat conduction and heat control.

In step 2, the heat insulation hard protection plate 300 with the protection plate crossrail 304 is pushed away towards the two sides along the protection plate groove 301, the cover mat 339 is removed, the top plate 302 is screwed out from the top plate thread 303 of the through-shaft 313, the through-shaft 313 is screwed out from the inner hard protection layer 356, the special optical fiber for seepage measurement 143 is twisted in a spiral manner along the through-shaft 313, and then passes through the cover mat 339, the outer hard protection barrel 337, the middle heat insulation layer 349, the hot-wire placement layer 350 and the inner hard protection layer 356, and is lead out to the outside of the calibration device.

In step 3, the through-shaft 313 is screwed into the inner hard protection layer 356, the top plate 302 is screwed to the through-shaft 313 through the top plate thread, then the cover mat 339 is screwed into the inner hard protection layer 356 to form an inner enclosed environment for heating; the heat insulation hard protection plate 300 with the protection plate crossrail 304 is pushed in towards the middle along the protection plate groove 301, and finally the entire calibration device is enclosed, the special optical fiber for seepage measurement is led into the optical fiber temperature demodulator, and the optical fiber temperature demodulator is opened.

In step 4, water addition is determined according to the length of the special optical fiber for seepage measurement 143 twisted on the through-shaft 313, the first temperature control meter 306 and the second temperature control meter 308 are opened, the temperature of a water body where the special optical fiber for seepage measurement 143 locates will be displayed on the first temperature control meter 306 and the second temperature control meter 308 in real time; the first temperature control meter 306 and the second temperature control meter 308 are adjusted to the temperature value needing to be heated, the power supply is turned on, the third conductive magnet 320, the second conductive iron-sensitive block 322 and the first conductive magnet 325 are used to respectively absorb the third conductive iron-sensitive block 321, the second conductive iron-sensitive block 322 and the first conductive iron-sensitive block 324; the temperature source wire 353 is energized and heated through the power temperature control meter 310; when the given temperature is reached, the third conductive magnet 320, the second conductive magnet 323 and the first conductive magnet 325 are driven to lose magnetism through the sintesistor 327, then the third conductive iron-sensitive block 321, the second conductive iron-sensitive block 322 and the first conductive iron-sensitive block 324 are respectively bounced off from the third conductive magnet 320, the second conductive magnet 323 and the first conductive magnet 325 through the third power-off spring 319, the second power-off spring 318 and the first power-off spring 317, then the temperature is kept to be constant and calibration is started.

In step 5, when cooling is needed, the power supply is turned on, the power temperature control meter 310 is disconnected, the pump 324 is opened via the cable wire 323 of the pump 324 by using the magnetism generated by the third conductive magnet 320, the second conductive magnet 323 and the first conductive magnet 325, the cold water in the circulating water tank 331 exchanges heat with the heated water body through the pressure inlet pipe 330 to achieve cooling; after the first temperature control meter 306 and the second temperature control meter 308 reach a value to be cooled, the third conductive magnet 320, the second conductive magnet 323 and the first conductive magnet 325 are driven to lose magnetism through the sintesistor 327, constant cooling is achieved through the third power-off spring 319, the second power-off spring 318 and the first conductive magnet 325, and calibration is conducted at the cooling value.

In step 6, a result value acquired by the optical fiber temperature demodulator and result values acquired by the first temperature control meter 306 and the second temperature control meter 308 are compared and analyzed on the basis of an optical fiber temperature sensing formula to finish calibration finally.

In step 7, the special optical fiber for seepage measurement 143 calibrated is driven to pass through the guide path 3, two groups of first, locking devices 4 are used to fix the first straight-line section of the guide path 3 on the bending table 1, and then the first locking rod 42 is rotated to fix the special optical fiber for seepage measurement 143, wherein the right end of the first locking device 4 closest to the bending section is aligned with the vertical scale; the second locking device 50 is sleeved on the guide path 3, then the guide path 3 is bent, the first locking devices 4 are approximately placed into the guide-track groove via the vertical scale according to the bending curvature radius required by the special optical fiber for seepage measurement 143, the first radius rule 5 tangential to the bending section is arranged at the intersection of the bending section and the first straight-line section, the second radius rule 9 tangential to the bending section is arranged at the intersection of the bending section and the second straight-line section, and the reading of the first radius rule is read out according to the intersection point of the first radius rule 5 and the second radius rule 9.

In step 8, the round connecting pole 14 is rotated, the diameter-variable connecting pole 12 is released, and then the diameter-variable connecting pole 12 and the second locking device 50 are moved, to make the reading of the first radius rule 5 and the reading of the second radius rule 9 be the bending curvature radius value of the special optical fiber for seepage measurement 143; the round connecting pole 14 is rotated, the diameter-variable connecting pole 12 is locked, the push rod 15 is rotated, the push pedal 16 is driven to be sufficiently contacted with the guide path 3 via the moving of the push rod 15 to fix the guide path 3, then the lug 503 is mounted, the second locking device 50 is fixed on the bending table 1 through a screw, then the second locking rod 505 is rotated, and the special optical fiber for seepage measurement 143 is fixed.

In step 9, after the special optical fiber for seepage measurement 143 is laid, the synchronous controller 102 and the computer 142 are opened to conduct access verification on the special optical fiber for seepage measurement 143, then the special optical fiber for seepage measurement 143 is laid horizontally and vertically in a structure region to be measured, so as to form grid optical fiber configuration in the space to be measured; the synchronous controller 102 and the computer 142 are opened to conduct secondary access detection on the special optical fiber for seepage measurement 143, multiple special optical fibers for seepage measurement 143 need to be laid in parallel in a complicated structure region for standby service, and the special optical fiber for seepage measurement 143 is connected to the optical path coupler 127 through the thermostatic chamber 129.

In step 10, switches to be measured in the seepage property identification device are turned on to debug the system, the special optical fiber for seepage measurement 143 is connected to conduct calibration and graduation; each channel is tested, the impulse light information of the special optical fiber for seepage measurement to be measured 143 is modulated through the synchronous controller 102 after there are no mistakes, the impulse light information data is collected through the collector 141, and then the data information is collected into the computer 142 for feedback analysis, so as to adjust and control the synchronous controller 102, the information is collected and conveyed into the monitoring information management and analysis assessment module 101 through the module configured with a remote cloud database 100.

In step 11, when the seepage water passes through a hydraulic structure region to be measured, double layer diameter-variable filtering is conducted on particle impurity in the seepage water by means of the gauze through-hole 204 of the first filter screen on the first filter screen 205 and the gauze through-hole 207 of the second filter screen on the second filter screen 206, and the seepage water is continuously and directly contacted with the single-core optical fiber 211 from four directions through the storage, filtering and drainage functions of the drainage water storage cotton sleeve 208, thus forming actual temperature difference.

In step 12, the temperature difference field of the region for measuring the hydraulic structure measured by the horizontal and vertical special optical fibers for seepage measurement 143 is drawn; in a region flowing through by the seepage water, partial mutation will occur to the temperature difference field since heat exchange will occur between the seepage water and the region to be measured, and partial heat will be taken away by the seepage water, and this portion is a seepage position namely; further, when the seepage water forms a channel for a free surface of water in the region to be measured, the relative caloric value taken away by the exchange between the water body and the outside is substantially equal at every place of the channel; therefore, the places with the same temperature difference values are connected along the upstream and downstream structure faces of the hydraulic structure, and intersection lines among the places with the same temperature difference values and the upstream and downstream structure faces of the hydraulic structure are namely seepage lines, thus achieving to sense the hydraulic structure seepage conditions.

Those described above are merely preferred embodiments of the invention It should be noted that, those having ordinary skills in the art can make a plurality of improvements and modifications without departing from the principle of the invention, and those improvements and modifications all fall in the scope of protection of the invention.

The invention claimed is:

1. A hydraulic structure seepage property distributed optical fiber sensing integrated system, comprising a seepage property identification device, a special optical fiber for seepage measurement, an optical fiber calibration device and an optical fiber laying device, wherein the special optical fiber for seepage measurement after being calibrated to be qualified by the optical fiber calibration device is mounted in a region to be monitored through the optical fiber laying device, and is connected to the seepage property identification device; and the optical fiber laying device comprises a bending table and a guide path located on the bending table, a middle of the guide path is provided with a guide groove, the special optical fiber for seepage measurement to be laid is mounted in the guide groove, the guide path comprises a first straight-line section, a second straight-line section and a bending section connecting the first straight-line section with the second straight-line section, the first straight-line section is fixed on the bending table through a plurality of groups of first locking devices, the inside of a middle of the bending section is connected to a diameter-variable table, one end of the diameter-variable table is connected to a diameter-variable connecting pole, the diameter-variable connecting pole passes through a round guide table, two sides of the round guide table are provided with round connecting poles in threaded connection with the round guide table, the round connecting pole is connected to a round connecting pole handle, another end of the diameter-variable table is connected to a fastening plug, a top end of which is provided with a circular arc, the fastening plug is provided with a guide hole for the guide path to pass through, the inside of the guide hole is provided with a push pedal, the push pedal is connected to a push rod, and the push rod is in threaded connection with the fastening plug; the second straight-line section is provided with a second locking device, a bottom of the second locking device is extended with a boss, a section of the boss is a parallelogram with a 45-degree included angle, the bending table is provided with a guide-track groove forming a 45-degree included angle with the first straight-line section and the second straight-line section, the boss moves along the guide-track groove, the bending table is provided with a vertical scale parallel to the second straight-line section, the zero point of the vertical scale is an intersection point of the special optical fiber for seepage measurement to be laid and the first locking device in a rightmost side, the origin of the guide-track groove is located at a zero point of the vertical scale, an intersection of the bending section and the first straight-line section is provided with a first radius rule tangential to the bending section, and an intersection of the bending section and the second straight-line section is provided with a second radius rule tangential to the bending section.

2. The hydraulic structure seepage property distributed optical fiber sensing integrated system according to claim 1, wherein a tail end of the first radius rule is internally sleeved with a first radius contraction rule, and a tail end of the second radius rule is internally sleeved with a second radius contraction rule.

3. The hydraulic structure seepage property distributed optical fiber sensing integrated system according to claim 2, wherein the first locking device comprises a first connecting table, and a first locking rod and a first handle in threaded connection with the first connecting table, the first connecting table is a rectangular block, a first recess for the guide path to pass through is arranged below the first connecting table, the first recess is internally provided with a first pressing plate located above the guide path, the first pressing plate is connected below the first locking rod, and the first handle is mounted above the first locking rod; the second locking device comprises a second connecting table, and a second locking rod and a second handle in threaded connection with the second connecting table, a second recess for the guide path to pass through is arranged below the second connecting table, the second recess is internally provided with a second pressing plate located above the guide path, the second pressing plate is connected below the second locking rod, the second handle is mounted above the second locking rod, another boss is extended below the second connecting table, and two sides of the second connecting table are extended with a lug.

4. The hydraulic structure seepage property distributed optical fiber sensing integrated system according to claim 3, wherein the optical fiber calibration device comprises a heat insulation barrel and a plurality of calibration modules located in the heat insulation barrel, the plurality of calibration modules are arranged around a circumference of the axis of the heat insulation barrel, the calibration module comprises a through-shaft, a first electronic thermometer and a second electronic thermometer, the special optical fiber for seepage measurement to be calibrated is twisted on the through-shaft, the special optical fiber for seepage measurement is connected to an optical fiber temperature demodulator outside the heat insulation barrel, the first electronic thermometer and the second electronic thermometer are respectively connected to a first temperature control meter and a second temperature control meter outside the heat insulation barrel, a temperature source wire for heating water in the heat insulation barrel is arranged in the wall of the heat insulation barrel, the temperature source wire is connected to a power temperature control meter outside the heat insulation barrel, the first temperature control meter is connected to a first power-off spring and a second power-off spring simultaneously through leads of the first temperature control meter, the first power-off spring is connected to a first conductive magnet, the first conductive magnet is in series connection with an electromagnetic circuit switch and a second conductive magnet simultaneously, the first conductive magnet is arranged opposite to a first conductive iron-sensitive block, the first conductive iron-sensitive block is connected to a pump through a cable wire of the pump, the pump is located in a circulating water tank, and the pump conveys water in the circulating water tank into the heat insulation barrel through a pressure inlet pipe; the second temperature control meter is connected to a third power-off spring through a lead of the second temperature control meter, the third power-off spring is connected to a third conductive magnet, the third conductive magnet is arranged opposite to a third conductive iron-sensitive block, the third conductive magnet is connected to a power supply through a sintesistor, and a power supply is connected to the electromagnetic circuit switch; the power temperature control meter is connected to the third conductive iron-sensitive block and a second conductive iron-sensitive block simultaneously through power temperature control leads, the second conductive iron-sensitive block is in series connection with the third conductive iron-sensitive block, the second conductive magnet is in series connection with the third conductive magnet, and the second conductive magnet is in series connection with the second power-off spring.

5. The hydraulic structure seepage property distributed optical fiber sensing integrated system according to claim 4, wherein the heat insulation barrel comprises a barrel body and a barrel cover, the barrel body comprises an outer hard protection barrel, a middle heat insulation layer, a hot-wire placement layer and an inner hard protection layer from outside to inside, the barrel cover is a heat insulation hard protection plate, the top of the barrel body is provided with a protection plate groove, and a protection plate crossrail capable of moving along the protection plate groove is mounted below the heat insulation hard protection plate; a lower end of the through-shaft is mounted in the inner hard protection layer through a thread, the top end of the through-shaft is connected to a top plate through a top plate thread, and the upper end face of the top plate is connected to a cover mat.

6. The hydraulic structure seepage property distributed optical fiber sensing integrated system according to claim 5, wherein the cover mat is arranged along circumferences of the top plate and the through-shaft, the temperature source wire is arranged along an entire circumference of the hot-wire placement layer from bottom to high, and both a side of the middle heat insulation layer and a side of the inner hard protection layer close to the temperature source wire are provided with a metal protection layer for protection.

7. The hydraulic structure seepage property distributed optical fiber sensing integrated system according to claim 6, wherein the seepage property identification device comprises an optical path coupler and a synchronous controller, the special optical fiber for seepage measurement is laid in a hydraulic structure seepage property monitoring region in a vertically staggered manner, the special optical fiber for seepage measurement is connected to the optical path coupler, a monitoring thermostatic chamber is arranged between the special optical fiber for seepage measurement and the optical path coupler, the synchronous controller is connected to a mode locked laser, a first wavelength division multiplexer, a polarization beam splitter, an isolator, a nonlinear amplifier, a grating pair, a liquid-crystal spatial light modulator, a diffraction grating, a reflector, a beam splitter, a nonlinear crystal, a spectrograph and a Michelson interferometer in sequence, an output end of the Michelson interferometer is connected to the optical path coupler, an output end of the optical path coupler is respectively connected to a detector and a second optical splitter, the detector is connected to a digital signal processor, the second optical splitter is connected to the digital signal processor through an amplifying circuit, an output end of the digital signal processor is respectively connected to the synchronous controller and a collector, an output end of the collector is respectively connected to the synchronous controller and a computer, the computer is connected to a module configured with a remote cloud database, and the module configured with a remote cloud database collects and conveys information to a monitoring information management and analysis assessment module.

8. The hydraulic structure seepage property distributed optical fiber sensing integrated system according to claim 7, wherein the amplifying circuit comprises a first amplifying circuit, a second amplifying circuit and a third amplifying circuit in parallel connection, the first amplifying circuit comprises a first photodiode, a third amplifier and a Stokes receiver connected in sequence, the second amplifying circuit comprises a second photodiode, a fourth amplifier and an anti-Stokes receiver connected in sequence, the third amplifying circuit comprises a third photodiode, a fifth amplifier and a Reyleigh optical receiver connected in sequence, the first photodiode, the second photodiode and the third photodiode are respectively connected to an output end of the second optical splitter.

9. The hydraulic structure seepage property distributed optical fiber sensing integrated system according to claim 8, wherein the output end of the Michelson interferometer is connected to an optoelectronic switch, the optoelectronic switch is provided with an L-side switch and an R-side switch, the L-side switch is connected to an input end of a master femtosecond impulse, the R-side switch is connected to an auxiliary femtosecond impulse, the master femtosecond impulse light of the master femtosecond impulse can enter an optical signal input end of the first amplifier, the auxiliary femtosecond impulse light of the auxiliary femtosecond impulse can enter an optical signal input end of a second amplifier, the optical signal output port of a first amplifier is connected to an input port of a first optical splitter, the output port of the first optical splitter is respectively connected to a signal input port of a second optical filter and the signal input port of a third optical filter, the optical signal output port of the second amplifier is connected to an optical signal input end of a first optical filter, the output ends of the first optical filter, the second optical filter and the third optical filter are connected to an input end of a second wavelength division multiplexer, and an output end of the second wavelength division multiplexer is connected to the input end of the second optical splitter.

* * * * *